United States Patent [19]
Ribeton

[11] 4,075,990
[45] Feb. 28, 1978

[54] DIESEL ENGINES

[75] Inventor: Jean Marie Ribeton, Mulhouse, France

[73] Assignee: Societe Alsa Clienne de Constructions Mecaniques de Mulhouse, France

[21] Appl. No.: 544,805

[22] Filed: Jan. 28, 1975

[30] Foreign Application Priority Data

Feb. 1, 1974  France .............................. 74 03387

[51] Int. Cl.² ............................................ F02D 23/00
[52] U.S. Cl. .................................. 123/119 C; 60/600; 60/602; 60/611; 123/90.6; 123/119 A
[58] Field of Search ................... 123/119 C, 107, 113, 123/116, 32 CY, 180 EH, 59 EC, 119 A, 90.6; 60/600, 602, 300, 302, 284, 611

[56] References Cited

U.S. PATENT DOCUMENTS

| | | | |
|---|---|---|---|
| 2,344,993 | 3/1944 | Lysholm | 123/105 |
| 2,491,380 | 12/1949 | Kutzler | 60/602 |
| 3,507,261 | 3/1970 | Myers et al. | 123/119 A |
| 3,925,989 | 12/1975 | Pustlenik | 60/602 |

FOREIGN PATENT DOCUMENTS

| | | | |
|---|---|---|---|
| 1,323,025 | 11/1963 | France | 123/119 C |
| 624,529 | 9/1961 | Italy | 60/302 |

*Primary Examiner*—Ronald H. Lazarus
*Attorney, Agent, or Firm*—Holman & Stern

[57] ABSTRACT

This invention relates to supercharged four-stroke Diesel engines.

The operating conditions of a supercharged four-stroke Diesel engine are improved, especially at starting and during low-load running, by keeping the exhaust valves open, both at starting and during all working conditions of the engine, at the end of the exhaust stroke and during the major portion of the induction stroke; the difference in natural pressure existing on low loads between the intake to and the exhaust from said engine is selectively increased to control the quantity of exhaust gases sucked back during the induction stroke.

5 Claims, 4 Drawing Figures

DIESEL ENGINES

FIELD OF THE INVENTION

The present invention relates to a method of improving starting, and low-load running conditions, in a supercharged four-stroke Diesel engine, and it also relates to Diesel engines operating in accordance with this method.

BACKGROUND OF THE INVENTION

It is known that, in Diesel engines, the ignition of the fuel is achieved by increasing the temperature of the charge of air, which increase is due to the adiabatic compression of the air in the cylinders. This is why the volumetric compression ratio, usual in these engines, is relatively high and generally not less than 12.

It is also known that the horse power of Diesel engines may be increased by supercharging, generally by means of a turbo-supercharger, the charge of air introduced into the cylinders, thus increasing the pressure at the end of compression and, consequently, the maximum pressure in cycle. The rate of supercharging is commonly from 2 to 3.

However, in order to limit the maximum pressures in cycle at full load, the volumetric compression ratio of supercharged engines is generally fixed at the minimum value compatible with good starting of the engine. It follows that in operation at no-load or at low-load, the temperatures in cycle are low, and on prolonged operation in cold weather the lubricating oil, set up again by the demulsification, cannot burn completely and "sticks" the exhaust valves. Likewise, during the cold weather, starting may be difficult as the ignition temperatures are difficult to reach.

SUMMARY AND OBJECT OF THE INVENTION

One of the objects of the present invention is to obviate these difficulties.

Up to the present time, in order to obviate disadvantages met at starting or during operation at low-load, especially during cold weather, it has been proposed to pre-heat the air introduced and to increase the temperatures in cycle by a regulation of the intake. The first method is complex and requires a source of heat, the second increases very perceptibly the consumption of fuel and, used without precaution, leads to counter-sweeping of the dead space and sooting up of the intake valve chests.

The method according to the invention consists in modifying the diagram of distribution in such a manner that, without bringing about any material loss of pressure in the flow of air and of the exhaust gases, a portion of the latter is recycled in the course of operation periods when the supercharging air pressure is less than the back pressure on scavenging of the cylinders.

In order to obtain this result, the exhaust valves should, according to the invention, be maintained open during a large portion of the induction stroke of the piston so that exhaust gases are sucked back into the cylinder at the same time as the intake in air. At the end of induction, the mixture confined in the cylinder will be at a temperature considerably higher than that to which a customary distribution diagram would have led, and this temperature will bring about an increase in the temperatures in the cycle.

As soon as, through increase in the charge, the turbo-supercharger quickening, the pressure on induction will become greater than the pressure on scavenging of the cylinder, the recycling of a fraction of the exhaust gases will cease and there will be brought about sweeping of the exhaust valves by the intaken air conducing to their cooling.

The recycling of the exhaust gases is linked with the pressure difference existing between the exhaust and the intake, with the angle of opening of the valves and their lift. The cooling effect of the exhaust valves is linked with the difference in pressure between intake and exhaust, and with the angle of opening of the valves, but varies very little with the lift of the exhaust valves, the cooling effect being a surface effect.

According to a further characteristic of the invention, the recycling of the gases is restricted by reducing the lift of the exhaust valves during the induction stroke. The adaptation of the lift will be such that for the maximum temperature of the air at admission to the cylinder in the most difficult operating conditions, the recycling of the gases is slightly less or at most equal to the maximum recycling tolerated by the engine.

The problems which have been pointed out hereinbefore with regard to starting and low-load running of Diesel engines, are even more accentuated in the case of Diesel engines known as "low compression ratio" engines. As a matter of fact, it is known that it is possible to increase by a considerable percentage (for example 30 to more than 100%) the horse power of an engine without considerably changing the mechanical and thermal stresses, by reducing its compression ratio (for example 7 or 8 instead of 12) and by increasing its supercharging ratio (for example 5 or 6 instead of 3).

With such engines, the ignition temperature (whatever may be the atmospheric temperature) cannot be achieved naturally at starting and at low-load, owing to the inadequate compression ratio.

It has thus been proposed for these engines to provide additional means enabling achievement of the ignition temperature at starting and at low-load. These known means consist, as has hereinbefore been indicated, in pre-heating the air at admission and also in causing the supercharger to be supplied forcibly at starting and at low-load. This is why it has been proposed to drive the supercharger by external means and/or to make the turbine of the turbo-super-charger operate as a gas turbine by means of an auxiliary combustion chamber.

Even if certain of these means have been shown to be efficient, fault can be found therewith, however, as they necessitate quite considerable modifications of the engine and require relatively complex servo-systems for their control as a function of the different running conditions of the engine.

The solutions proposed by the invention, that is to say opening of the exhaust valves during the major portion of the induction stroke and adaptation of the lift of the exhaust valves may, however, not be satisfactory in other working conditions, such as for example, starting or operating at no-load in very cold weather, or application to Diesel engines of low compression ratio.

According to the invention, in order to obviate these difficulties, the partial recycling of the exhaust gases is also increased by influencing the pressure difference existing between exhaust and intake by means of adjustable devices enabling the bringing about during running of variable losses in charge in the exhaust or intake loops, or both simultaneously.

The proposed method for improving the operating conditions of a supercharged Diesel engine, especially at starting and during low-load running in cold weather, therefore, can also consist in bringing about voluntarily and selectively a back-pressure in the exhaust pipe. This back-pressure may be brought about by means of a shutter, opening of which is controllable, this shutter being disposed preferably downstream of the turbine of the turbo-supercharger. The back-pressure may also be brought about, in the case of marine engines, by causing the exhaust pipe to issue below flotation level.

Simultaneously, or separately, a controllable loss of charge may be created in the intake loop, as has already been proposed in French Pat. No. 1,323,025.

Finally, in the case of engines with low compression ratio, or in the case of starting in very cold environments, the method according to the invention provides for preheating temporarily the air contained in the exhaust collector, or for introducing hot air into this collector prior to starting and during starting, so as to assist the increase in temperature of the gases which are recycled in accordance with the method which has been hereinbefore indicated.

The invention will be better understood on reading the detailed description which follows and on examining the accompanying drawings which show, by way of example, one manner of carrying out the invention. In the drawings:

DESCRIPTION OF A PREFERRED EMBODIMENT

Figure 1:
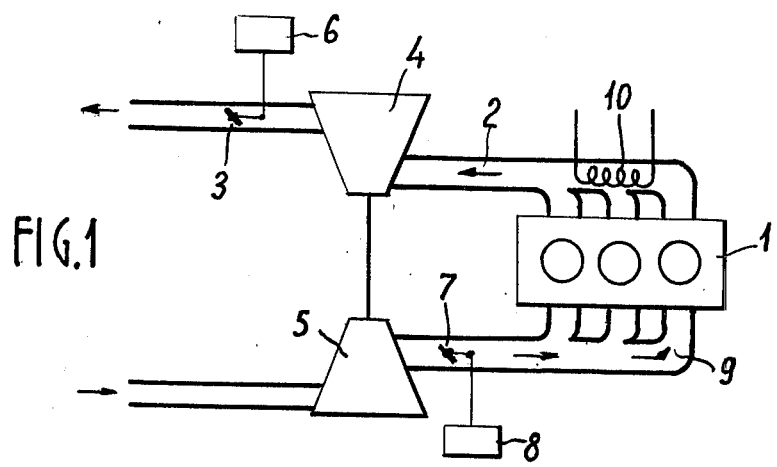
FIG. 1 is a diagrammatic view of a Diesel engine to which the improvements of the invention are applied.

The supercharged Diesel engine shown in FIG. 1 may be an engine with normal compression volumetric ratio (for example of the order of 12 or more) or else an engine of low compression ratio (for example of the order of 7 or 8).

The engine 1 consists mainly in a distribution system in which the tappets are adjusted so that the exhaust valves are kept open, at least partly, during the major portion of the induction stroke. This distribution system will be described in more detail in connection with FIGS. 3 and 4.

The engine also includes adjustable means bringing about selectively a back-pressure in the exhaust pipe 2 and constituted, for example, by a movable shutter 3 located downstream of the turbine 4 of the turbo-compressor 4-5.

The shutter is controlled by a servo-system 6, this depending upon the injection control and upon the temperature (ambient temperature at intake and/or exhaust temperature).

Another shutter 7 controlled by a servo-system 8, may be provided on the induction manifold 9 of the engine as has been described in the aforesaid patent.

In the case where the invention is applied to a low compression ratio engine or in the case of starts in very cold environments, there is moreover provided a system of preheating the exhaust collector 2 (represented by a heating resistance 10) which may be put into service, for example manually, just before starting of the engine and kept in service, (for example by means of a timer) for sufficient time to enable the engine to keep up steady idling. The preheating system may also comprise a hot air inlet in the exhaust loop, or air preheated by the aforesaid resistance, this hot or preheated air going through the collector against the flow and thus increasing the temperature of the recycled gases.

The preheating of the exhaust collector may also be effected by means of a heater opening into the exhaust pipe upstream of the shutter 3, for example between this shutter and the turbine 4, this shutter being closed during the prestarting period.

Figure 2:
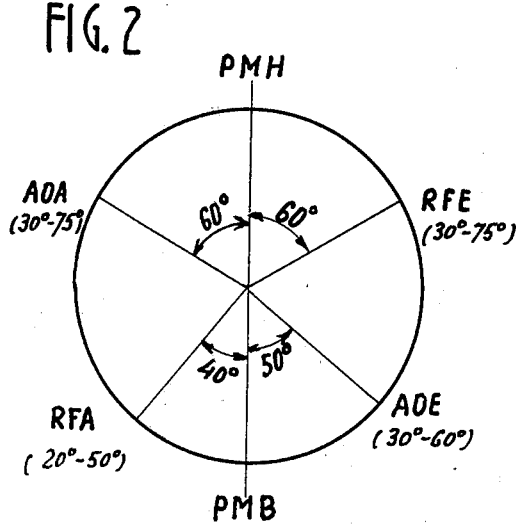
FIG. 2 represents the distribution cycle of a classic Diesel engine.
Figure 3:
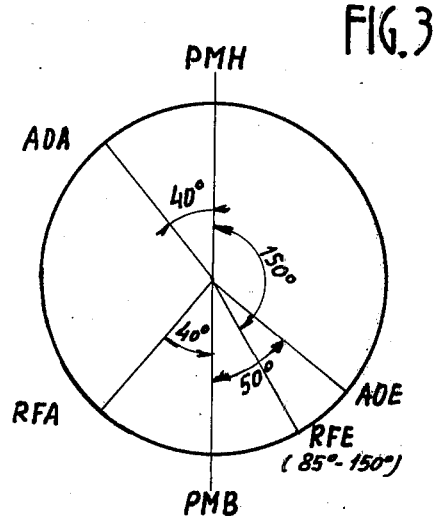
FIG. 3 represents the distribution cycle of an engine conforming to the invention.

FIGS. 2 and 3 show, respectively, the timing of the valve on a classic Diesel engine and on an engine in accordance with the invention, and show the advance and retard angles of opening and of closing at exhaust and at intake.

The angles are indicated by the references AOE-RFE AOA-RFA counted from the top and bottom dead centres (PMH-PMB).

Whereas on classic engines (FIG. 1) the retard in closing at the exhaust (RFE) is normally between 30° and 75°, generally about 60°, in an engine according to the invention, the exhaust valve remains open during the major portion of the induction stroke, the retard in closing the exhaust being between about 85° and 150°, to enable recycling of the gases as has hereinbefore been described.

In particular, it may be noted that the recycling is assisted by the fact that the exhaust valve is always open when the piston is at its maximum speed during the induction stroke.

As the time the valves are idle is increased to a very large extent by increasing the retard in closure at the exhaust, it may be advantageous in any engine according to the invention to reduce slightly the advance of opening at the intake (AOA), for example about 40° (FIG. 3) instead of about 60° on classic engines (FIG. 2).

Figure 4:
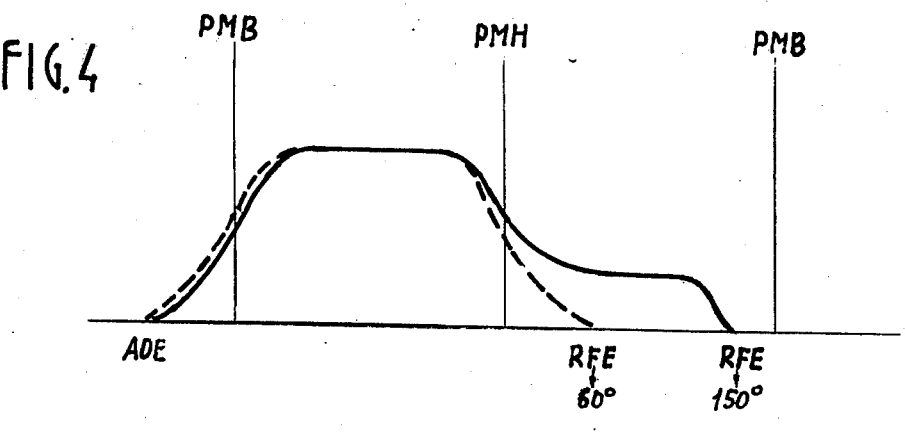
FIG. 4 shows the lift curve of the exhaust valves in a classic engine and in an engine according to the invention.

FIG. 4 shows in a full line the curve of the lift of the exhaust valve in an engine according to the invention, and in a broken line the same curve in a classic engine.

During about the second half of the induction stroke, the lift of the valve is only partial and this, as has been indicated hereinbefore, limits recycling of the gases without materially reducing the cooling effect of the exhaust valves.

Of course the invention is in no way limited to the example described and shown, and is capable of numerous modifications open to the expert without thereby departing from the scope of the invention.

I claim:

1. A method of improving operating conditions, especially at starting and during low-load running, of a super-charged four-stroke Diesel engine in which the intake air pressure is normally higher than the pressure at the exhaust during the normal operating load of the Diesel engine and in which the intake air pressure is normally lower than the pressure at the exhaust during low loads of the Diesel engine, comprising keeping the exhaust valves open during more than the first half, but less than the second half of the intake stroke, and selectively increasing the difference in said intake and exhaust pressure existing on low loads to control the quantity of exhaust gases drawn from exhaust to the intake during the intake stroke.

2. A method according to claim 1, in which said increase in the difference in pressures is obtained by selective setting up of a regulable low back-pressure in the exhaust loop of said engine.

3. A method according to claim 1, in which said increase in the difference in pressure is obtained by selective creation of a regulable low loss of charge in the intake of said engine.

4. A method according to claim 1, especially for improving the working conditions of low volumetric compression ratio Diesel engine, which consists in temporarily preheating, prior to starting, the gases contained or introduced on stopping in the exhaust of said engine.

5. A method according to claim 4, in which the exhaust valves are only partly lifted at the end of the exhaust stroke and during more than the first half, but less than the second half of the intake stroke.

* * * * *